March 24, 1931.  E. G. BREMER  1,797,818
CANDY BAR MACHINE
Filed May 26, 1930  2 Sheets-Sheet 1
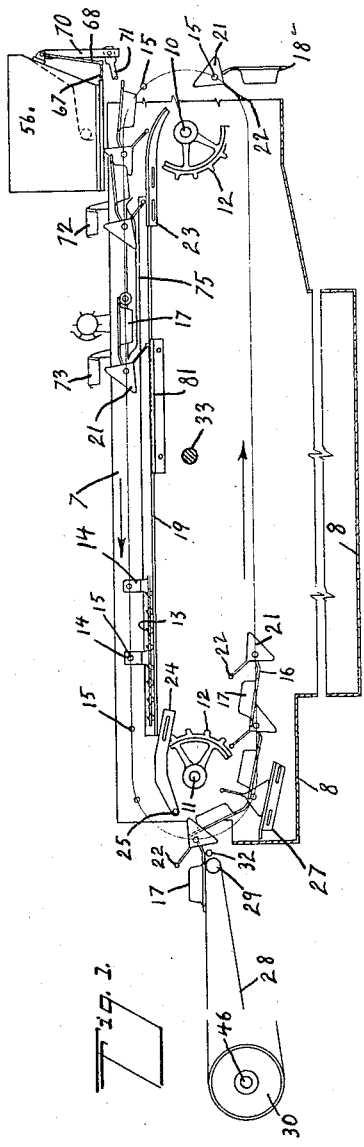
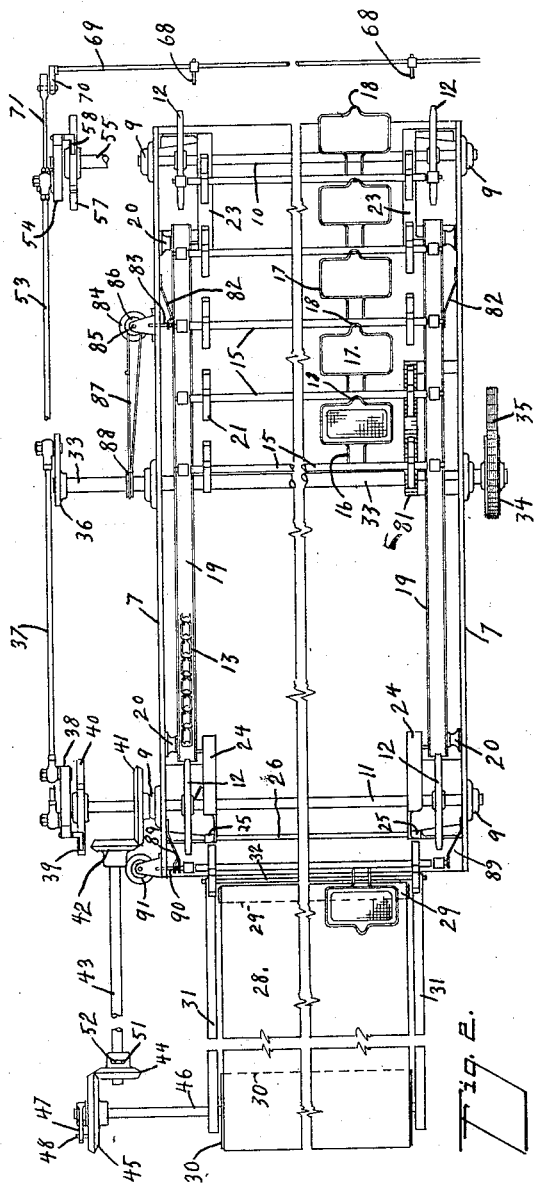
E. G. BREMER. INVENTOR
BY David O. Barnell.
ATTORNEY March 24, 1931. E. G. BREMER 1,797,818
CANDY BAR MACHINE
Filed May 26, 1930 2 Sheets-Sheet 2
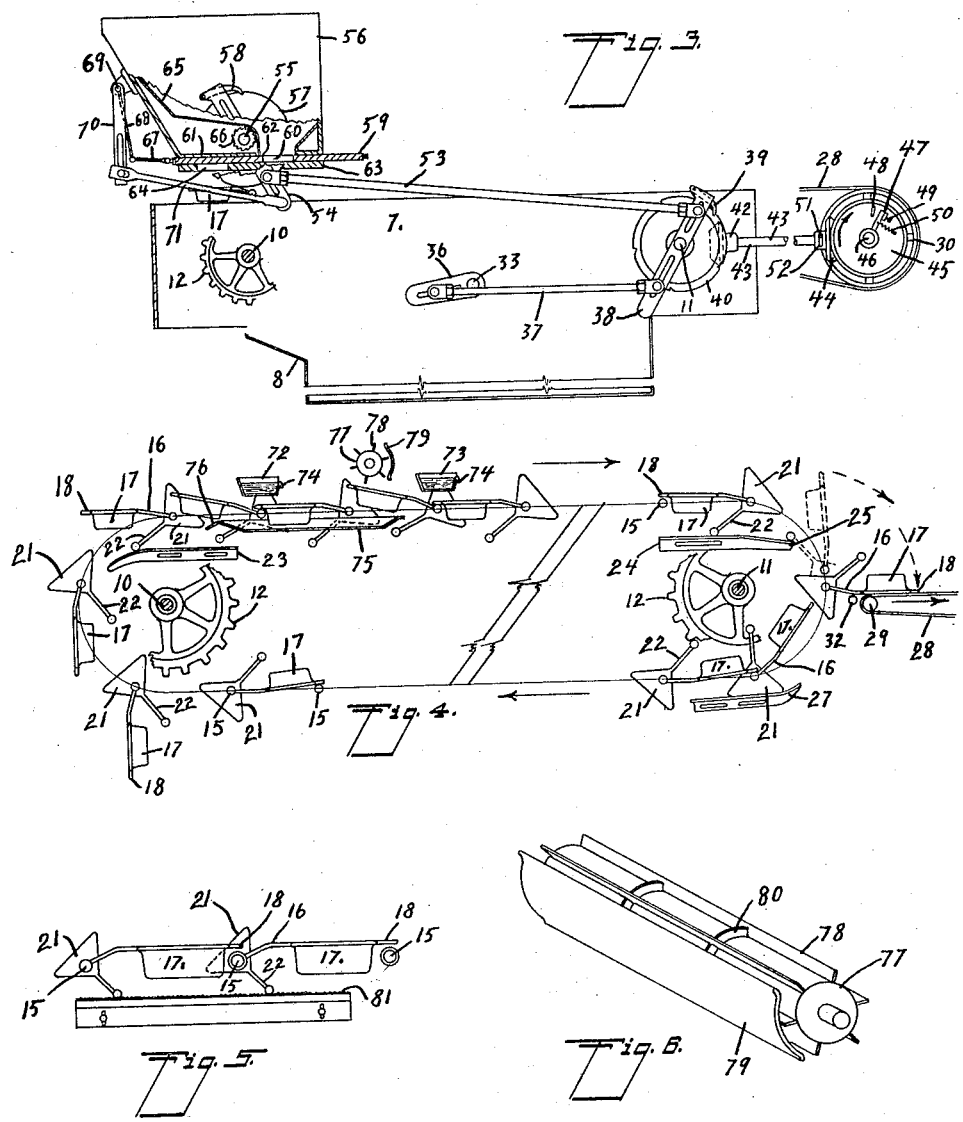
E. G. BREMER, INVENTOR
BY David C. Barnell
ATTORNEY Patented Mar. 24, 1931

1,797,818

UNITED STATES PATENT OFFICE

EMIL G. BREMER, OF BURLINGTON, IOWA

CANDY-BAR MACHINE

Application filed May 26, 1930. Serial No. 455,728.

My invention relates to candy making machines, particularly to machines for producing candy bars consisting of centers or fillers having a chocolate coating, or in which a plurality of solid pieces, such as nuts, are both coated and bound together by a body of chocolate or a like material. It is the general object of my invention to provide an efficient, economical and automatically operating machine for producing in large quantities candy bars of the class above mentioned. More specific objects are to provide cups or molds in which the components of the candy bars are assembled and the coating or binder cooled sufficiently to maintain the molded formation; to provide endless intermittently movable conveying means on which the mold-cups are mounted and by which the same are moved successively to positions for receiving the several components of the bars; to provide means for flowing the coating or binding material over the solid components in the mold-cups; to provide mold-cups having foraminous bottoms through which the coating material may flow; to provide means for dipping the mold-cups in a container filled with the coating material to effectively coat the bottoms of the bars; to provide means for shaking or agitating the mold-cups to insure the uniform and effective flow of the coating material and to dislodge any excess of said material; to provide means for inverting the mold-cups to discharge the molded material therefrom; to provide means for shaking the mold-cups while in their inverted position, to effectively loosen and insure the discharge of the material therefrom; to provide means for feeding the solid materials into the mold-cups; to provide conveying means for receiving the molded bars at the mold-discharging position; and to provide suitable actuating means for the various operating parts, whereby the same are caused to act in properly timed sequence.

In the accompanying drawings, Fig. 1 is a vertical longitudinal section of a machine embodying my invention, the view being partly diagrammatic in character, and immaterial or repetitional portions being omitted or broken away, Fig. 2 is a plan view of the machine, this view also being partly diagrammatic and having repetitional portions omitted, Fig. 3 is a partial side view, showing the principal actuating means, and having portions broken away, Fig. 4 is a diagrammatic side view, showing the mold-cups in the several operating positions assumed thereby at different portions of the travel of the endless conveying means, Fig. 5 is a detail side view of one of the shaking or agitating devices, and Fig. 6 is a perspective view of a feeding device or dropper for cream centers and the like.

In carrying out my invention according to the illustrated embodiment thereof, I provide a suitable supporting frame for the operating mechanism, said frame consisting principally of parallel side-plates 7 extended upwardly from a metal tank or receptacle 8, which forms a base for the mechanism, and also serves to receive the drip and overflow of the coating material, and as a reservoir for containing the supply of coating material. Near opposite ends of the side-plates 7 are bearings 9 in which the parallel transverse conveyor-shafts 10 and 11 are journaled respectively near the front and rear ends of the frame. On said conveyor shafts, adjacent to the side-plates, are secured pairs of sprocket-wheels 12, and about said sprocket-wheels are extended the endless conveyor-chains 13, each of which has horizontal upper and lower portions extending between the wheels tangentially thereof. At uniform transversely alined portions of the chains 13, special attachment-links therein are provided with outstanding lugs 14, and in each transversely alined pair of said lugs there is journaled a shaft or cross-rod 15. To each cross-rod 15 a plurality of mold-cups are connected by means of resilient wires of which the end portions 16 are secured to the rod and extend at right angles thereto, the intermediate portion of each wire being formed into a loop extending about the cup 17, and a bow 18 of the wire extending out from the cup at the side opposite the rod. The support-wires are so proportioned that on the cross-rods between the horizontal portions of the conveyor-chains, the wire bows 18 will slightly overlap and normally rest upon the rod 15 next rearward from the rod to which the ends of the wires are secured. The mold-cups may be of any desired form, and those illustrated in the drawings are of oblong substantially rectangular shape, slightly rounded at the corners, and slightly tapered from the open top toward the foraminous bottom thereof, the side-portions of the cups being imperforate, and the bottoms being formed of coarse wire screen. The upper horizontal portions of the conveyor-chains are guided and supported by channel-shaped track-bars 19, which are secured to the adjacent side-plates 7 by bracket-members 20, as indicated in Fig. 2. On each cross-rod 15, near the ends thereof which are journaled in the chain-lugs 14, is secured a triangular cam 21 having at one corner thereof an extended finger 22. Adjacent to the track-bars 19 at the front or feeding end of the machine are guides or cam-tracks 23 adapted for engaging the cam-fingers 22 as hereinafter described, said cam-tracks being connected with and supported from the adjacent portions of the track-bars. Similarly connected with the track-bars 19 at the rear or discharge end of the machine are the guides or cam-tracks 24, and at the rear ends of said guides are trip-pins 25, a cross-rod 26 extending transversely between the guides in alinement with said trip-pins. Other guides or cam-tracks 27 are positioned below the conveyor-chains at the rear end of the machine, as best shown in Figs. 1 and 4, said guides 27 being adapted for engagement by the cams 21 as hereinafter described.

An endless conveyor-belt 28 passes over a small roller 29 arranged near the rear end of the main or mold-conveyor mechanism, said belt being driven from a large roller 30 at the rear end thereof, said rollers 29 and 30 being journaled in a suitable auxiliary frame 31, and said frame also supporting a small trip-roller 32 adjacent to the belt-roller 29, as shown in Figs. 1 and 2.

In the intermediate portions of the side-plates 7 is journaled the main drive-shaft 33, which carries at one end a drive-pulley 34 connected by a belt 35 with a suitable source of power. At its other end the main-shaft 33 carries a crank 36, from which a connecting-rod 37 is extended to the lower portion of a slotted rocker-arm 38 mounted pivotally upon the conveyor-shaft 11, the arrangement being such that continuous rotation of the crank 36 will impart an oscillating or rocking motion to the arm 38. The upper portion of the arm 38 carries a pawl 39 adapted for operative engagement with a ratchet-disk 40 secured on the shaft 11, whereby to intermittently actuate said shaft and the mold-conveyor. A bevel-gear 41, secured on the shaft 11, meshes with a bevel pinion 42 on a shaft 43 extending longitudinally rearward therefrom. At the rear end of said shaft 43 is a second bevel pinion 44 which meshes with a bevel gear 45 mounted loosely on the shaft 46 which carries the rear conveyor-roller 30. An arm 47, affixed to the shaft 46, extends between lugs 48 on the side of the gear 45, one of said lugs carrying an adjusting-screw 49 whereby the play or lost-motion between the lugs and the arm 47 may be varied. A tension spring 50 is connected with the arm 47 and the gear 45 as shown in Fig. 3, and tends to hold the arm in engagement with the adjusting screw 49. The bevel pinion 44 is connected with the shaft 43 by means of a pin 51 extending into a slot 52 in the hub of the pinion, whereby to enable a limited variation in the rotation of said shaft and pinion. From the upper end of the rocker-arm 38 a connecting-rod 53 extends forwardly to a rocker-arm 54 mounted pivotally on a shaft 55 journaled in and extending transversely through the hopper 56 of the nut-dropper, the arrangement being such that the arm 54 receives an oscillating movement similar to that of the arm 38. A ratchet-disk 57 is secured on the shaft 55 and is operatively engaged by a pawl 58 on the rocker-arm 54, whereby said shaft is actuated intermittently, its movement being effected during the time when the drive-pawl 39 for the mold-conveyor is making its back-stroke, and the mold-conveyor is thus stationary.

The hopper 56 of the nut-dropper is arranged above the front end of the machine, as shown in Figs. 1 and 3, and within the bottom portion of the hopper there is a feed-plate 59, having openings or pockets 60 therein, said plate being arranged slidably between an upper plate 61 having an opening 62, and a lower plate 63 having an opening 64, said plates 61 and 63 being affixed to the hopper. Adjoining one side of the opening 62, is the lower edge of a thin plate 65 which extends up diagonally to the front side of the hopper, to which it is attached, the lower portion of said plate resting upon a serrated roller 66 carried on the intermediate portion of the shaft 55, so that rotation of said shaft serves to cause a vibratory movement of the plate and thus to agitate the contents of the hopper to insure the descent of the material by gravity into the opening 62. The sliding plate 59 is movable from a position at which the pockets 60 are in register with the opening 62 in the plate 61, to a position at which said pockets are in register with the opening 64 in the plate 63, whereby said pockets receive material from the hopper at the first position, and discharge said material through the opening 64 at the second position. For actuating the sliding feed-plate of the nut-dropper, said plate is connected by links 67 with arms 68 extending downwardly from a transverse shaft 69 mounted at the front side of the hopper. Said shaft 69 has at one end a depending slotted arm 70 which is connected with the rocker-arm 54 by a rod 71, so that the latter is actuated reciprocatingly. The head of the rod 71, at the arm 70, is slotted to allow a slight dwell of the feed-plate 59 at the end of each stroke, before commencing its return stroke.

In the operation of the machine the intermittent movements of the mold-conveyor are such that at each pause in the movement of the mold-cups a row of the cups are positioned beneath the discharge-opening 64 of the nut-dropper, so as to receive therefrom a charge of nuts from the pockets 60 of the feed-slide.

Rearwardly of the nut-dropper, pans 72 and 73 are arranged to extend transversely above the mold-conveyor, and melted chocolate or a like coating material is supplied thereto by suitable means, well-known in the art, and not shown in the drawing. At one edge of each of the pans 72 and 73 is a lip 74 over which the chocolate may overflow to fall in a sheet upon the materials in the mold-cups passing beneath the pans. Beneath the mold-conveyor, and positioned longitudinally adjacent to the pans 72 and 73, there is arranged a dip-pan 75, having at the front edge thereof an inclined lip 76 adapted to engage the mold-cups and slightly lift them as they pass rearwardly over it, and allowing the cups to dip into the pan after passing said lip. The rear edge of the pan 75 is also inclined to lift the cups over it as they pass from the pan after traversing the same in the dipping operation. The dip-pan is supplied with coating material from the same source as the pans 72 and 73. Above the mold-conveyor, intermediate the pans 72 and 73, there may be arranged a cream-center dropper, of which the structure is shown in Fig. 6, comprising a rotating cylinder 77 having a plurality of longitudinally extending flanges or wings 78 which are partially inclosed by an arcuate guard-plate 79 at the descending side of the cylinder. The longitudinal spaces intermediate the wings 78 are divided or partitioned by annular flanges 80, to form compartments corresponding in number with the number of mold-cups in each row.

During the rearward movement of the mold-cups, after passing the dip-pan, the same are caused to vibrate vertically by means of serrated or undulating cam-tracks 81 arranged beneath the cams 21 so as to be engaged by the fingers 22. As shown in Fig. 5, the track-members 81 are adapted to cause a slight lifting of the mold-cups, whereby the bows 18 of the support-wires are raised from the cross-rods 15 sufficiently to allow the desired vertical vibratory movements.

Horizontal transverse vibratory movements of the mold-cups are effected by vibrating longitudinally the cross-rods 15, which are so held in the conveyor-lugs 14 as to allow such movement. As shown in Fig. 2, flat springs 82 are secured to the frame side-plates 7 and extend diagonally rearward and inward, so that their inner end portions are adapted to engage the ends of the cross-rods 15 as the latter are in positions at which the movement of the conveyor is interrupted. To one of the springs 82 is connected a rod or pin 83 which extends slidably through the side-plate 7 and at its outer end engages a serrated wheel 84 mounted in a bracket 85 on the side-plate. A small pulley 86 is secured to the wheel 84 and is connected by a belt 87 with a pulley 88 on the main drive-shaft 33, whereby the vibrator-wheel 84 is driven continuously. A similar transverse vibrator, comprising springs 89, pin 90 and wheel 91, is arranged at the rear end of the machine, in a position for shaking or vibrating the molds at the discharge position thereof.

As hereinbefore noted, the wires 16 which support the mold-cups are so proportioned that between the horizontal portions of the conveyor-chains the bows 18 will slightly overlap and normally rest upon the cross-rod 15 next behind the rod to which the respective support-wires are secured. When passing about the sprocket-wheels 12, however, the spacing of the cross-rods 15 is increased by reason of the lugs 14 outstanding from the chains, so that the cross-rods carried in said lugs move along a path of greater radius than that of the main body of the chain, and the increased spacing of the rods is such that the bows 18 of the support-wires may pass between the rods.

After the mold-cups have passed beneath the dropper to receive nuts or the like therefrom, and the coating material has been applied thereto from the pans 72 and 73 and by dipping in the pan 75, as before described, the horizontal travel of the molds before arriving at the rear end of the machine is sufficient to allow the cooling and setting of the coating material, and the described vibratory movements imparted to the mold-cups insures the even flow of the coating material about the solid components, and the separation of excess coating material by passing through the foraminous bottoms of the mold-cups. Upon approaching the rear end of the machine, the fingers 22 on the cams 21 engage the guides or cam-tracks 24, as best indicated in Fig. 4, and as the respective rods to which the molds are connected commence to pass downwardly on the arcuate path about the rear conveyor-shaft 11, said fingers 22 engage the trip-pins 25. By said engagement of the fingers and trip-pins, as each rod 15 approaches the horizontal plane of the shaft 11, the molds connected with said rod are first raised to the vertical position shown by dotted lines in Fig. 4, from which a slight additional downward movement of the cross-rod causes the mold-cups to be thrown over to the inverted position, resting upon the front portion of the conveyor-belt 28, shown in said Fig. 4. The driving means for the mold-conveyor is so arranged that the pause, between the intermittent movements of said conveyor, occurs as the mold-cups reach the described inverted position over the belt 28, and the shock or jar at the termination of the inverting movements tends to loosen the clusters or candy-bars from the molds and cause them to be deposited upon said belt. The transverse vibrating means, formed by the springs 89 and their associated parts, are provided as a further precaution, to insure the loosening of the material from the mold-cups at the discharging or dumping position. After the inversion of the mold-cups at the dumping or discharging position, as described, and at the commencement of the next movement of the mold-conveyor, the support-wires 16 engage the trip-roller 32 and pivot about the same as a sliding fulcrum during the downward movement of the respective cross-rod 15, whereby the cups 17 are lifted from the molded material deposited upon the belt 28. At about the same time that the terminal portions or bows 18 of the support-wires pass out of engagement with the trip-roller 32, the cams 21 engage the lower guides or cam-tracks 27, and hold the molds in a raised inclined position, such as shown in Fig. 4, until at the next movement along the lower horizontal portion of the travel the cams 21 pass out of engagement with said tracks 27, whereupon the molds drop to a horizontal inverted position, at which the bows 18 rest upon the following cross-rod 15. This position is maintained throughout the horizontal movement of the molds toward the front end of the machine, but at the beginning of the upward travel in the arcuate path about the front conveyor-shaft 10, the bows 18 become disengaged from the cross-rods, by reason of the before-mentioned increase in the spacing of said rods during the arcuate travel, and the molds then hang in the vertical positions shown at the left-hand portion of Fig. 4. On approaching the upper level at which the horizontal rearward movement is commenced, the fingers 22 engage the cam-tracks 23 and cause the molds to be lifted to a substantially horizontal position by rotation of the cross-rods in their bearings in the lugs 14, and while the molds are in such raised position, the following cross-rods 15 again come into place under the bows 18, to support the same during the horizontal rearward travel, after the fingers 22 have passed the tracks 23.

The driving connections for the conveyor-belt 28 are such that, in general, the intermittent movements of said belt are made at the same time as those of the mold-conveyor, but because of the discharge of the molded product by the dumping or inversion of the mold-cups onto the conveyor-belt, as above described, it is desirable that the starting of the movement of said belt be slightly delayed relatively to the starting of the mold-conveyor, in order that the mold-cups may be lifted away from the belt before the movement of the latter begins. The desired lag or delay in starting the movement of the conveyor-belt is attained by the provision of the described lost-motion devices in the connections between the shaft 43 and bevel pinion 44, and between the gear 45 and the shaft 46 which carries the belt-drive roller 30. At the conclusion of each driving movement of the shaft 43, the motion of the belt 28 may continue momentarily, the arm 47 at the end of the shaft 46 moving forward into engagement with the adjusting-screw 49, and if the momentum of the belt and roller 30 is not then exhausted, the gear 45 and pinion 44 may also advance slightly, such movement of the pinion being permitted by the slot 52 and the pin 51 which forms the driving connection from the shaft 43 to said pinion. The pull of the spring 50 upon the arm 47 also tends to cause an advance of the conveyor-belt subsequent to the cessation of the driving movement directly imparted to said arm 47 through the pinion 44 and gear 45. At the beginning of the actuating movement of the shaft 43, which is coincident with the beginning of movement of the mold-conveyor, the pin 51 must first be moved into engagement with the end of the slot 52 to start the motion of the pinion and the gear 45, and the latter must move sufficiently to bring the rear lug 48 into engagement with the arm 47, before motion of said arm and of the conveyor-belt is commenced, so that the resulting delay is sufficient to enable the mold-cups to be lifted from the belt, to clear the molded bars which have been deposited thereon.

It will be seen from the foregoing that my invention provides a simple and inexpensive machine, entirely automatic in operation, and capable of producing economically a large output of nut-clusters, candy-bars, or similar molded and coated confections; many variations of the specific structure being, of course, apparent to those skilled in the art.

Now, having described my invention, what I claim and desire to secure by Letters Patent is:

1. In a machine of the class described, a plurality of open-topped mold-cups having foraminous bottoms, pivoted supporting means connected fixedly with said mold-cups, intermittently movable conveying means carrying said pivoted supporting means and adapted to move the same in an endless path having horizontal upper and lower portions and arcuate end portions, means for feeding solid materials into said mold-cups during pauses in the movement of said conveying means, means for applying coating material to the solid material in the mold-cups, means for vibrating the supporting means to agitate the materials in the mold-cups, and means controlling said pivoted supporting means to invert the mold-cups and discharge the molded materials therefrom.

2. In a candy-bar forming machine, an endless flexible conveyor having horizontal upper and lower portions and arcuate end portions, transversely alined longitudinally spaced lugs outstanding from said conveyor, a series of cross-rods mounted pivotally in said transversely alined lugs, mold-support members secured to said cross-rods and normally trailing therefrom to rest upon the following cross-rod of the series, mold-cups carried by said support members and normally positioned between the successive pairs of cross-rods, means positioned above the upper horizontal portion of the conveyor for feeding materials into said mold-cups, means for vibrating the cross-rods to agitate the contents of the mold-cups, and means for turning the cross-rods about their pivotal axes to invert the mold-cups and discharge the contents thereof.

3. In a candy-bar forming machine, an endless flexible conveyor having horizontal upper and lower portions and arcuate end portions, a series of longitudinally spaced lugs outstanding from said conveyor and arranged in transversely alined pairs, cross-rods mounted pivotally in said transversely alined pairs of the lugs, mold-support members secured to said cross-rods and each extending therefrom to normally overlap and rest upon the following cross-rod, mold-cups carried by said support members and depending therefrom between the cross-rods, said mold-cups having foraminous bottoms, means for feeding solid materials into said mold-cups, means for flowing coating material upon the solid materials in the mold-cups, a dip-pan arranged beneath the horizontal upper portion of the conveyor in the normal path of the depending mold-cups, said dip-pan provided at its edges with inclined portions for lifting the mold-cups over said edges, and means controlling pivotal movement of said cross-rods for agitating materials in the mold-cups and for inverting the mold-cups to discharge the contents thereof.

4. In a candy-bar forming machine, a pair of parallel endless conveyor-chains having horizontal upper and lower portions and provided with outstanding lugs uniformly spaced longitudinally and arranged in transversely alined pairs, a cross-rod mounted pivotally and slidably in each pair of said lugs, mold-support members secured to said cross-rod and normally extending therefrom toward the following cross-rod, mold-cups carried by said support members and depending therefrom between the cross-rods, said mold-cups having foraminous bottoms, a pan arranged between the upper horizontal portions of the conveyor-chains in the normal path of the mold-cups, means for lifting the mold-cups over the edges of said pan whereby to dip the foraminous bottoms into said pan while passing across the same, means for feeding solid materials into the mold-cups, means for flowing coating material over the solid materials in the mold-cups, means for moving the cross-rods pivotally and axially to agitate the materials in the mold-cups, and means for moving the cross-rods pivotally to swing the mold-cups to a discharging position.

5. In a candy-bar forming machine, endless conveying means having horizontal upper and lower portions and arcuate end portions, rods mounted pivotally on said conveying means and extending transversely thereof, mold-support members secured to said rods and extending therefrom longitudinally of the conveying means, mold-cups carried by said support members and normally positioned intermediate said rods, means for feeding charges of solid materials into said mold-cups, means for actuating said conveying means and said feeding means intermittently, means for flowing coating material over the solid materials in the mold-cups, means for shaking excess of coating material from the mold-cups, and means for moving said rods pivotally to invert the mold-cups and dump material therefrom while said rods are at a point on the arcuate path thereof about one of the end portions of the conveying means.

6. In a structure as set forth in claim 5, a conveyor-belt arranged to receive the material dumped from the inverted mold-cups, means connecting said conveyor-belt with the mold-conveyor actuating means, and means for lifting the inverted mold-cups from said conveyor-belt at the beginning of the movements of the mold-conveyor.

7. In a structure as set forth in claim 5, a conveyor-belt arranged to receive the material dumped from the inverted mold-cups, means connecting said conveyor-belt with the intermittent actuating means, means for lifting the inverted mold-cups from said conveyor-belt at the beginning of the advancing movements of the mold-conveyor, and means for causing a lag in the starting of advance movements of said conveyor-belt while the mold-cups are lifted from the dumped material.

8. In a candy-bar machine, intermittently actuated endless conveying means having horizontal upper and lower portions and arcuate end portions, rods mounted pivotally and slidably on said conveying means and extending transversely thereof at uniformly spaced longitudinal portions thereof, mold-support members secured to said rods and extending therefrom longitudinally of the conveying means, mold-cups carried by said support-members and normally depending therefrom intermediate said transverse rods, means for delivering charges of solid material into said mold-cups during pauses in the movement of said conveying means, means for flowing coating material over the solid materials in said mold-cups, means for moving said transverse rods pivotally and axially to shake the mold cups vertically and transversely, means controlling movement of said transverse rods pivotally to cause inversion of the mold-cups and dump material therefrom while said rods are at a point on the arcuate path thereof about one of the end portions of the conveying means, and intermittently movable conveying means for receiving the materials dumped from the mold-cups at the inverted position thereof.

EMIL G. BREMER.